United States Patent [19]

Yamada et al.

[11] Patent Number: 4,839,760
[45] Date of Patent: Jun. 13, 1989

[54] READ/WRITE APPARATUS FOR DISK CARTRIDGE

[75] Inventors: Noboru Yamada; Tomohiko Abe; Osamu Miyazawa, all of Suwa, Japan

[73] Assignee: Seiko Epson Corporation, Tokyo, Japan

[21] Appl. No.: 63,043

[22] Filed: Jun. 17, 1987

[51] Int. Cl.$^4$ .............................................. G11B 5/012
[52] U.S. Cl. .............................. 360/97.01; 360/99.01
[58] Field of Search ...................... 360/97, 133, 98-99

[56] References Cited

U.S. PATENT DOCUMENTS 4,482,929 11/1984 Beck ..................................... 360/133
4,685,010 8/1987 Tronzono .............................. 360/97

Primary Examiner—A. J. Heinz
Attorney, Agent, or Firm—Blum Kaplan

[57] ABSTRACT

A disk cartridge having a cleaning mechanism. The disk cartridge comprises a disk for peripheral storage of computer and a hard shell which is made of plastic and contains the disk.

A liner is disposed between a disk and a shell. An opening is provided in one part of shell and a plate is disposed in the opening to press a liner. In order to press the plate, a pressure means such as a spring is provided in a read/write apparatus. As a result, dust is completely removed from the disk.

Further, a pressure means for pressing the liner is provided outside of a shell, maintaining the stable pressure of spring for a long time. As a result, disk is improved in reliability.

8 Claims, 9 Drawing Sheets

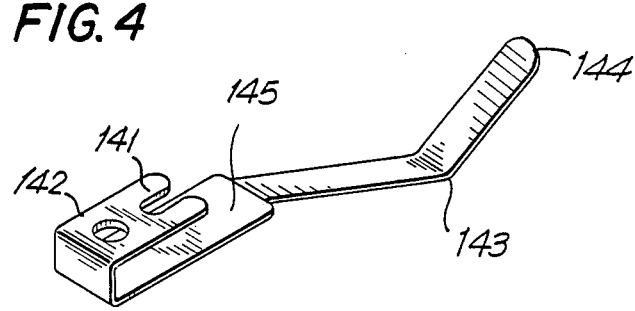
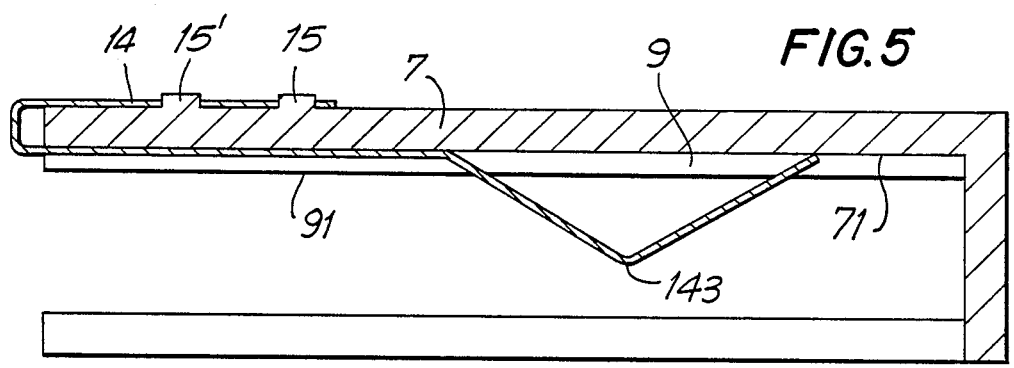
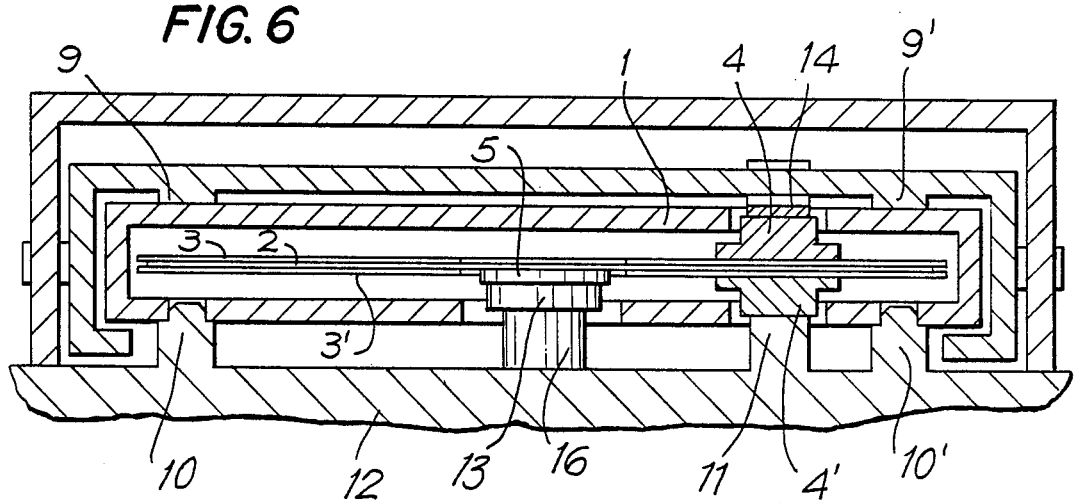

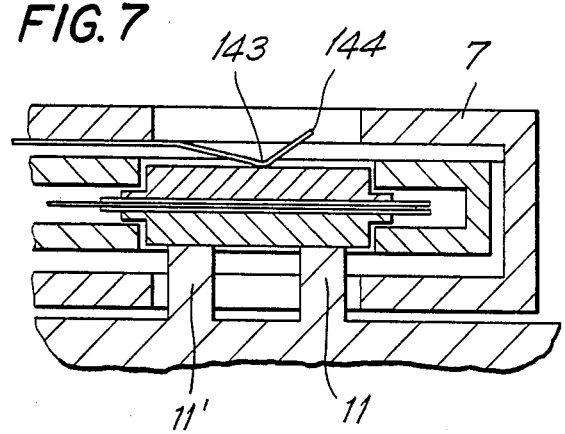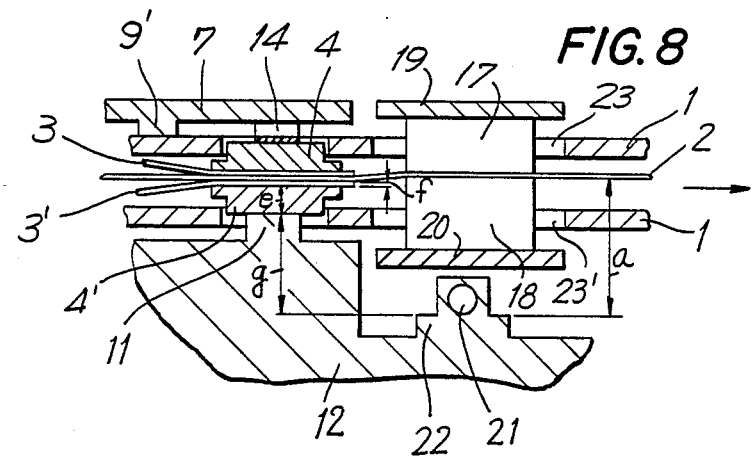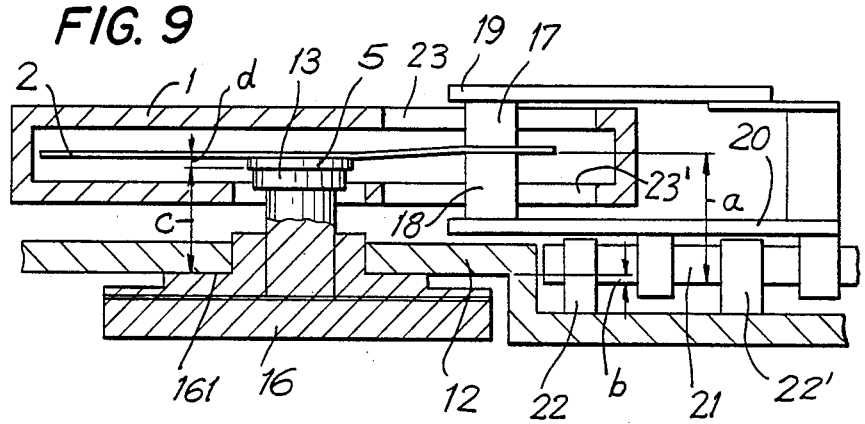

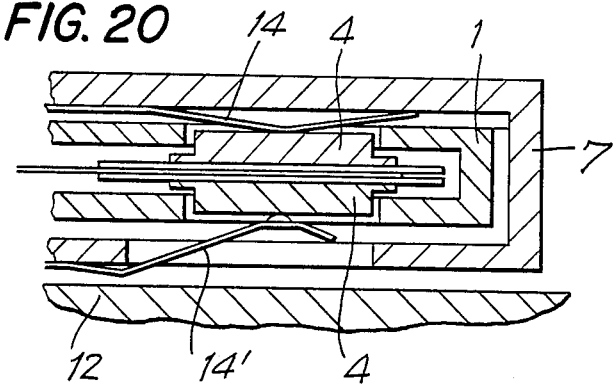
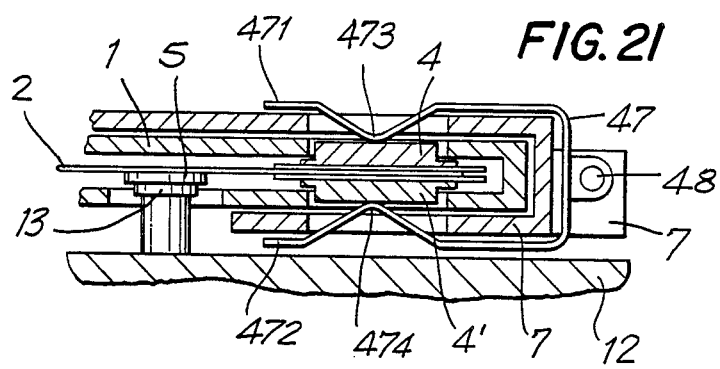
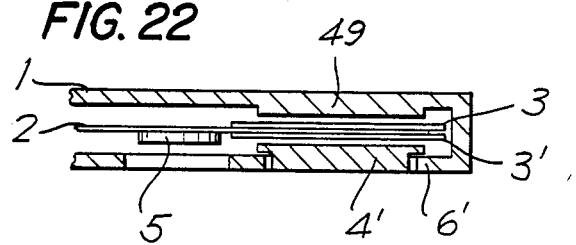

READ/WRITE APPARATUS FOR DISK CARTRIDGE

TECHNICAL FIELD

This invention relates to a read/write apparatus for a disk cartridge, in particular, to a disk cleaning mechanism therein.

BACKGROUND ART

A well-known conventional disk cartridge as shown in U.S. Pat. No. 4,445,157 uses the cleaning system whose shell containing a disk, a liner and an elastic member, in which a liner is pressed down on a disk by virtue of the spring of the elastic member, thereby removing dust from the disk.

However, this disk cartridge has some problems. For example, the pressure is reduced with time and the required force is not maintained because of aged deterioration of the elastic member deformed all the time to push the liner. Further, there is a severe restriction on the configuration and the thickness of an elastic member in order to set the elastic member in the smaller, thinner-sized disk cartridge. Especially, for a magnetic disk, there is a restriction that a magnetic material as the elastic member can not be used near to the disk. Therefore, it is very difficult to obtain the proper pressure.

The present invention solves the above problems and an object of the present invention is to provide a read/write apparatus for a disk cartridge having the disk cleaning mechanism in which the desirable pressure of liner against the disk is easily obtained and the pressure scarcely changes with time and another factors.

DISCLOSURE OF THE INVENTION

Namely, the present invention provides a read/write apparatus for reading and writing information using:
a disk cartridge comprising:
  a disk as a read/write medium;
  a liner contacting with said disk to remove dust from the desk, and
  a shell setting the disk and the liner therein; wherein
  an opening is provided in the shell; and
  a plate disposed in the opening opposite against the disk surface and pressed from outside, thereby pressing the liner down on the disk; and
  the means for pressing plate provided on said read/write apparatus to press the plate.

BRIEF DESCRIPTION OF THE DRAWINGS

FIG. 4 is an external view of a spring.

FIG. 5 is a sectional view of a read/write apparatus in which a spring is provided inside of a frame.

FIG. 6 is a sectional view of a read/write apparatus in which a disk cartridge is inserted herein and set on the predetermined position for reading or writing information.

FIG. 7 is a sectional view of an example utilizing a cantilever spring.

FIG. 8 is a sectional view of a read/write apparatus for illustrating the relation between a head and a plate supporting member in height.

FIG. 9 is a sectional view of a read/write apparatus and illustrates the relation between a driving hub surface and a head in height.

FIG. 16 (b) is a sectional view of an example in which a spring structure is separated into a contact portion and a spring body.

FIG. 20 is a sectional view of an example comprising a frame in which two springs are provided.

FIG. 21 is a sectional view of an example in which the plate is sandwiched by a spring.

FIG. 22 is a sectional view of a disk cartridge in which the upper plate is one part of a shell.

BEST MODE FOR CARRYING OUT THE INVENTION

Embodiments according to the present invention are explained below in reference to accompanying drawings.

FIGS. 1 to 6, 8, 10 and 11 show Embodiment 1 according to the present invention.

Figure 1:
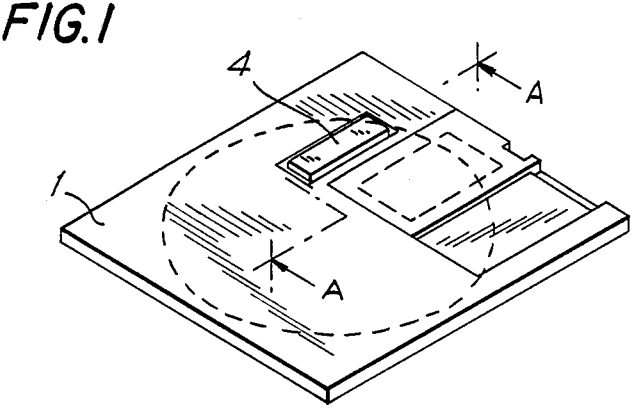
FIG. 1 is an external view of a disk cartridge.
Figure 2:
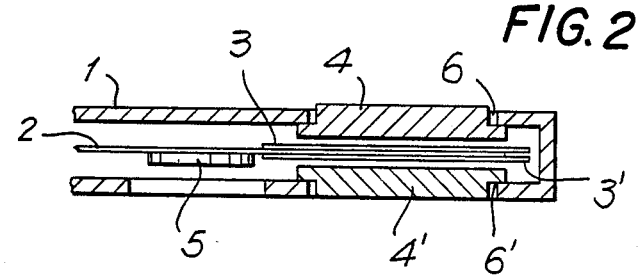
FIG. 2 is a sectional view of a plate portion of a disk cartridge.

FIG. 1 is an external view of a disk cartridge according to the present invention. FIG. 2 is a sectional view of a disk cartridge taken along A—A as shwon in FIG. 1. The refernce numeral 1 is a shell. Disk 2 is contained in shell 1 so that it can be rotated freely. Liner 3 or 3' are formed of a soft material and fixed to the shell 1 at one part thereof. Opening 6 or 6' is provided in shell 1. Plate 4 or 4' is fitted into an opening 6 or 6', respectively and a part thereof is opposed against the disk surface. The plate is shaped and positioned so that it can be finely moved against shell 1 and that is can not be removed from the fitting portion, with liner 3 or 3' between the disk and the plate. The reference numeral 5 is a hub material to which disk 2 is fixed.

Figure 3:
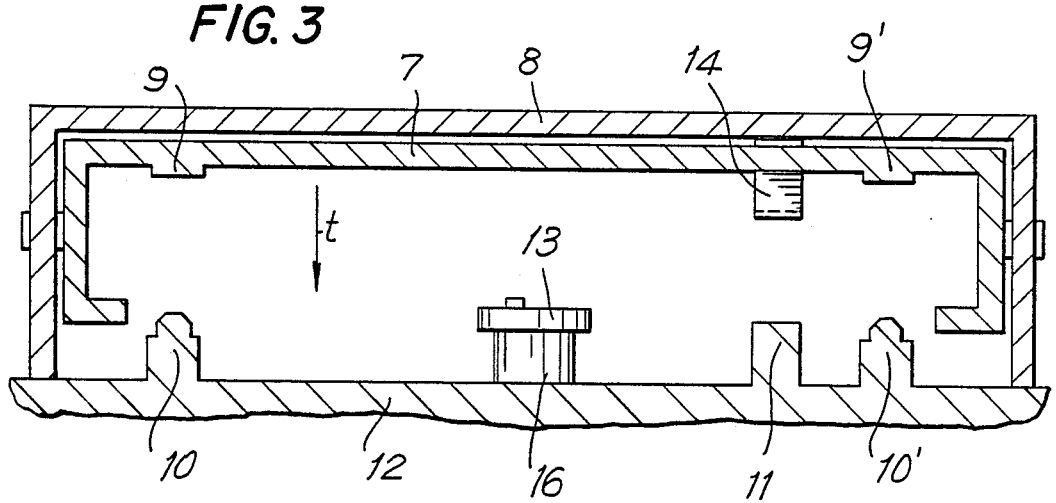
FIG. 3 is a sectional view of a mechanism for holding and positioning a disk cartridge.

FIG. 3 is a sectional view of a mechanism for holding and positioning a disk cartridge. The reference numeral 7 is a frame for containing a disk cartridge. Loading frame 8 holds frame 7 at the position for reading and writing information or at the position for taking out a disk cartridge and moves the frame between both the positions using cam mechanism which is not illustrated in the drawing. The reference numeral 16 is a disk driving source a part of which is illustrated in the drawing. Chassis 12 holds disk driving source 16, a disk cartridge holding mechanism, and a read/write transducer holding-moving positioning mechanism and so on. Positioning pin 10 or 10' is provided in chassis 12 so that a disk cartridge is held at the predetermined position. Projection 9 or 9' is provided in frame 7 so that it directly contacts with a disk cartridge. Plate supporting member 11 is provided in chassis 12 so that it directly contacts with plate 4'. Driving hub 13 is provided in disk driving source 16, and chucks hub material 5 to transfer the driving force.

Spring 14 is a pressure means, shaped as shown in FIG. 4, and mounted on frame 7 as shown in FIG. 5. In FIG. 4, the reference numerals 142 and 141 are a positioning hole and a positioning slit, respectively.

In FIG. 5, projection 15 is fitted into positioning slit 141 and projection 15' is fitted into positioning hole 142, thereby positioning spring 14. When a disk cartridge is inserted into frame 7, stopper member, which is not illustrated, for stopping loading frame 8 is taken off loading frame 8. As loading frame 8 is moved, frame 7 is moved into the arrow direction t in FIG. 3, thereby becoming the condition for writing or reading information as shown in FIG. 6. Thus the disk cartridge is positioned in contact with positioning pin 10 or 10', and the disk cartridge is pressed and fixed by projection provided in frame 7 which is pressed by a spring which is not illustrated in the drawing. Hub material 5 is chucked by driving hub 13, thereby positioning disk 2 and becoming the condition that the disk is driven by driving source 16. Since the plane 144 and the point 145 of spring 14 contact with the plane 71, respectively, and edge 143 directly contacts with plate 4, spring 14 is deformed by pressure of flame 7 against the disk cartridge, and plate 4 is pressed according to the amount of deformation. Since plate 4 is freely movable within the limited space, liner 3 is pressed by plate 4. On the other hand, since plate 4' is positioned in direct contact with plate supporting member 11, liners 3 or 3' is pressed down on each side of disk 2 sandwiched between plate 4 and plate 4'. As a result, dust can be removed from the disk by the liners.

In the Embodiment, a spring is disposed in a gap between frame 7 and a disk cartridge. Therefore, the following advantages are obtained:

Spring 14 can be mounted only by simple positioning means since the counterforce of pressure can be supported on the points at which plane 71 contacts with plane 145 and point 144, respectively and no special mounting member is required. And the spring can be easily assembled into the apparatus.

In addition, the length of between edge 143 and point 144 is the approximately same as that of between plane 145 and edge 143, so point 144 of the spring directly contacts with plane 71. Therefore, when a disk cartridge is removed from frame 7, the interference caused by the engaging of wall of opening 6 and spacing 14 is prevented. When the displacement amount of spring is easily enlarged by a weaker spring or a cantilever spring, as shown in Example 2, in FIG. 7, an opening is provided in frame 7, thereby being point 144 free. Here, there is no problem if the length of between edge 143 and point 144 is as short as shown in FIG. 7.

Subsequently, the plate supporting member in Embodiment 1 is described below.

FIG. 8 shows the relation between a head as a transducer and a plate supporting member in height. Arrow A shows the rotating direction of a disk supported by upper carriage 19. The reference numeral 17 is an upper head supported by lower carriage. Opening 23 or 23' is provided in shell 1 to bring the head in direct contact with disk 2. Lower carriage 20 is fixed so that it can be slided with respect to chassis 12 through slide axis 21. Lower carriage 20 is fleely movable into the radial direction of disk 2 and fixed into the perpendicular direction with respect to the rotating surface of disk 2. Upper carriage 19 is mounted on lower carriage 20 so that it can be rotated around the junction of both carriages. A loading spring, which is not illustrated in the drawing, presses upper head into the direction of lower head 18.

FIG. 9 shows the relation between the driving hub surface and a head surface in height. This mechanism is utilized in a read/write apparatus for a floppy disk. Slide axis holder 22 or 22' is one part of chassis 12 and slide axis 21 is fixed to the slide axis holder. Disk driving source 16 is mounted on chassis 12 at mounting surface 161. The reference letter a stands for the height from the slide axis 22 or 22' to the upper surface of lower head 18. The reference letter b stands for the height from slide axis holder 22 or 22' to mounting surface 161. The reference letter c stands for the height from mounting surface 161 to the upper surface of driving hub 13. The reference letter d stands for the total thickness of hub material 5 and the binder which binds disk 2 with hub material 5.

The relation of the above reference letters a to d is represented as $a-b-c=d+\alpha$, wherein $\alpha \geq 0$, thereby obtaining the desirable head touch.

In this example, the reference letter g stands for the height from slide axis holder 22 or 22' to plate supporting member 11. The reference letter e stands for the thickness of plate 4'. The reference letter f stands for the thickness of liner 3' when the force of spring 14 is applied to the liner. The relation of the reference letters a to g is represented as $a-g=e+f+\beta$, wherein $\beta \geq 0$. Namely, the portion of disk 2 sandwiched between the plates 4 and 4' is positioned downwards by $\beta$ from the contact point of head and disk to lower head 18. Therefore, disk 2 is pressed down on lower head 18 by virtue of the deformation thereof and completely touched with lower head, thereby advantageously obtaining the desirable head touch. In addition, even if the driving hub has errors in height, disk is deflected into the direction of surface or axis, or the disk is deformed, then the height of the disk is advantageously constant at the portion sandwiched between plates 4 and 4'. Plate supporting member 11 more easily maintains the high-accurate height and to finely controlling the height, compared with driving hub 13 which is one part of disk driving mechanism composed of many members. The optimum value of β should be calculated from the experiment result since β is different depending on the configuration of lower head 18, the method for mounting lower head 18 on lower carriage and so on.

Figure 10:
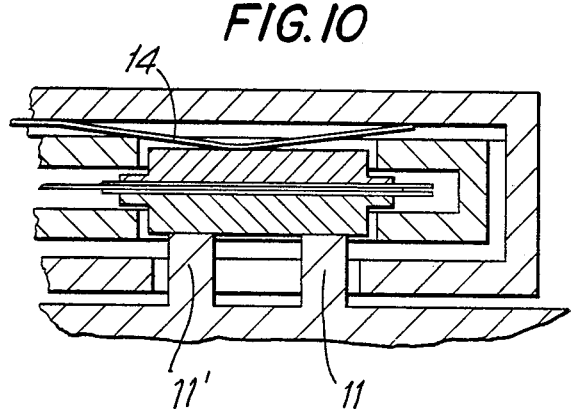
FIG. 10 is a sectional view of a read/write apparatus and illustrates the position where a plate contacts with a plate supporting member and a spring, respectively.
Figure 11:
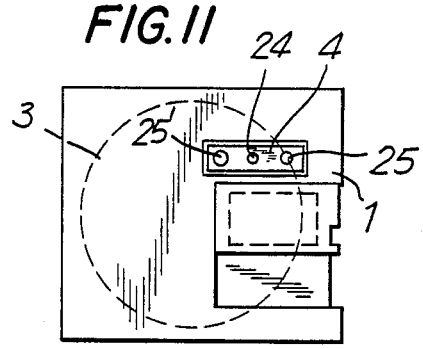
FIG. 11 is a plant view of a read/write apparatus and illustrates a position where a plate contacts with a plate supporting member and a spring, respectively.

As mentioned above, the height of plate supporting member 11 should be maintained high-accurately. However, when plate supporting member 11 can be contacted with plate 4' at the large area, neither the contact surface is smooth nor the actual contact point is positioned at the determined point, thereby causing error in height, the tilt of plate 4' and so on. When spring 14 contacts with plate 4 at the large contact area, neither spring 14 presses plate 4 at the determined point nor the distribution of pressure of spring is uniform in between plates 4 and 4', thereby causing the bias of cleaning pressure. Accordingly, in Embodiment 1, two plate supporting members 11 and 11' are provided as shown in FIG. 10. Thus plate 4' is supported by two portions having a small area, and plate 4 contacts with spring 14 at one point. FIG. 11 is a plan view illustrating the position at which plate supporting member 11 or 11' contacts with the plate and spring 14 contacts with the plate. The reference numeral 24 is the point at which spring 14 contacts with the plate. The plate contacts with plate supporting members 11 or 11' at contact points 25 and 25', respectively.

Of course, if the contact surface has a small area, there are no problems that one plate supporting member is used. The head of spring may be shaped as shown in Example 3 in FIG. 12 in order to contact the spring with plate 4 in a small area such as contact point 24.

Figure 12:
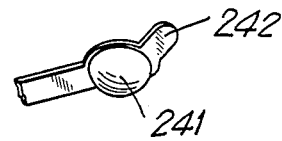
FIG. 12 is an external view of a head of a spring, whose contact portion with a plate is spherical.

In FIG. 12, spring has the spherical surface 241 which contacts with plate 4 and projection 242 which prevents the disk cartridge from engaging with the spring when the disk cartridge is removed.

Figure 13:
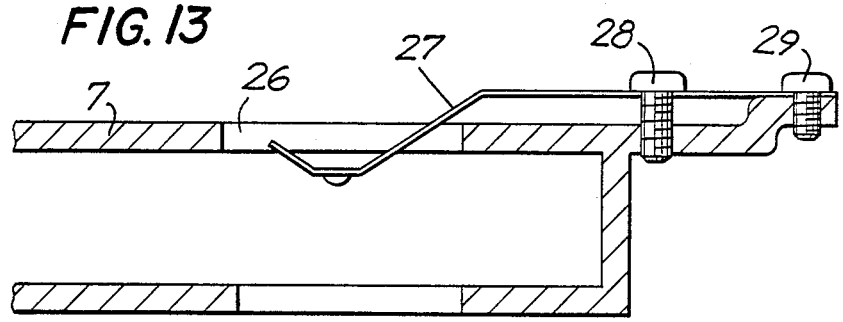
FIG. 13 is a sectional view of an example in which a spring is provided outside of a frame.

In aforementioned Embodiments 1 and 2, a spring as a pressure means is provided in between a frame and a disk cartridge. For another examples, a spring may be provided outside of the frame as shown in Example 4 in FIG. 13 and a spring may be one part of the frame as shown in Embodiment 5 in FIG. 14. Spring 27 presses plate 4. Screw 29 fixes spring 27 to frame 7. Control screw 28 controls the height of spring 27. Opening 26 is provided in frame 7 in order to directly contact spring 27 with plate 4. Since spring 27 is provided outside of frame 7, control screw 8 can be provided. Accordingly, the height control of spring 27 makes spring force to meet with required pressure. Needless to say, if the predetermined pressure is obtained with realizable dimensional accuracy of members, simple fixed structure is available. Spring 27 can be fixed to the plate by caulking, welding, adhesive or the like other than screw such as Embodiment 4.

Figure 14:
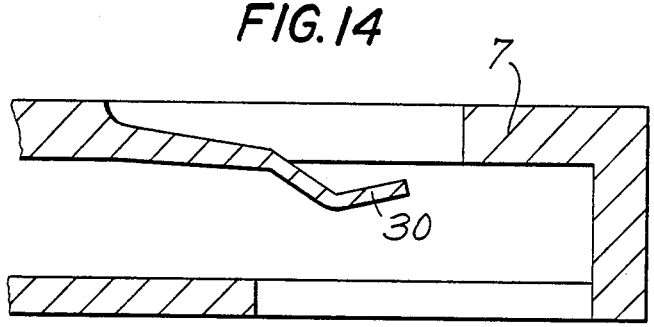
FIG. 14 is a sectional view of an example in which a spring is one part of a frame.

In FIG. 14, spring 30 is one part of frame 7. The structure of a spring into a frame provides a pressure means without increasing the number of members of enlarging space occupied by members. Spring 30 is a square sheet-shape, and, for example, spiral spring may be used to obtain the long length of spring within the limited area.

Figure 15:
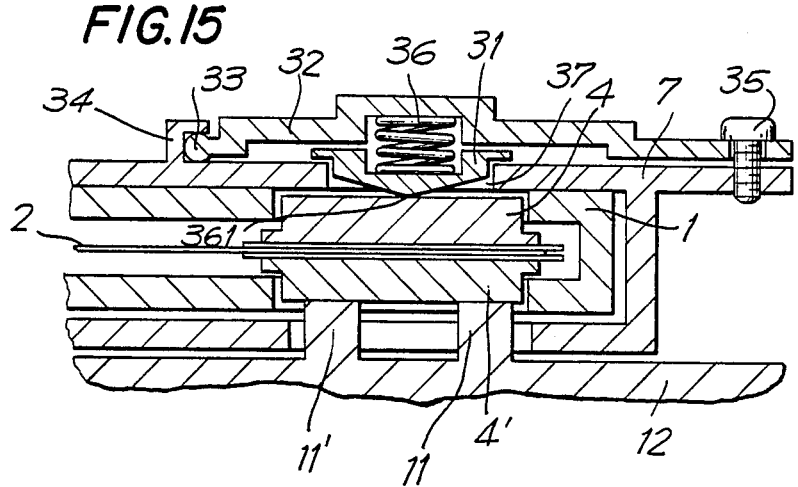
FIG. 15 is a sectional view of an example utilizing a coiled spring.

In addition, coiled spring as shown in Embodiment 6 in FIG. 15 can be used other than a leaf spring. In FIG. 15, plate press 31 is fixed into opening 37 so that it is freely movable within a limited range. Coiled spring 36 presses plate press 31. Spring press 32 supports coiled spring 36. Positioning projection 34 holds spring press 32 at one end 33 of spring press 32 so that spring press 32 can be rocked. Control screw 35 presses spring press 32 at one end. Since the position of spring press 32 is changed by control screw 35, the pressure of spring can be met with the desirable intensity. Of course, when desirable pressure is obtained with the desirable dimensional accuracy of members, spring press 32 can be one part of frame 7 without projection 34 and control screw 35.

Under the above mentioned structure, plate press 31 can be more freely changed in configuration of the portion 361 which directly contacts with plate 4. The portion 361 of plate press 31 can be more freely positioned in the plane direction and the position is correctly maintained.

Figure 16A:
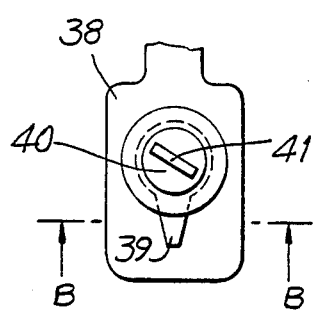
FIG. 16 (a) is a plan view of an example in which a spring structure is seperated into a contact portion and a spring body.
Figure 16B:
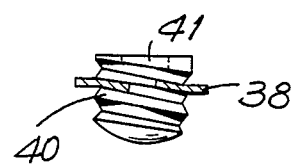

When a leaf spring can be used, the contact point is seperated from the spring as shown in Example 7 in FIG. 16, thereby freely changing the configuration of the contact portion. FIG. 16 (b) is a sectional view of example taken along B—B in FIG. 16 (a). The reference numeral 38 is a spring body and the reference numeral 40 is a contact portion. Spring body 38 has a hole and split 39 and contact portion 40 is cut in the shape of a screw. Thus contact portion 40 can be screwed and fitted into spring body. Since contact portion 40 can be made of plastic etc., the portion at which spring contacts with plate 4 can be spherical, cone or the like in shape. Further, the length from the end of contact portion 40 to spring body 38 is changed because contact portion 40 is rotated using slit 41, thereby controlling spring force.

Figure 17:
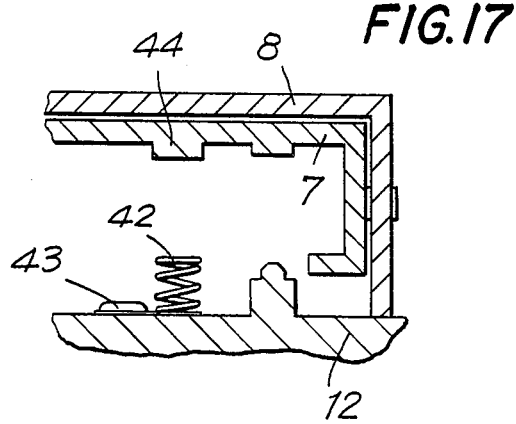
FIG. 17 is a sectional view of an example in which a positioning means is provided in frame and a spring is provided on chassis.
Figure 18:
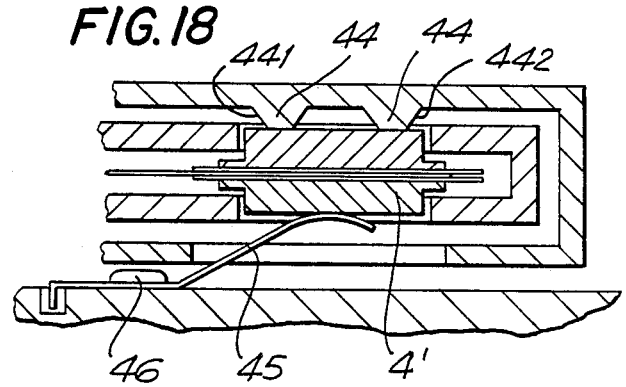
FIG. 18 is a sectional view of a read/write apparatus in which a positioning means is provided in a frame and a leaf spring is provided on a chassis and shows the condition that the a disk cartridge is set.

As above mentioned Embodiments, a spring as a pressure means is provided in frame 7 for containing disk cartridge, and plate supporting member 11 or 11' for supporting and positioning the plate is provided in chassis 12 in which pin 10 or 10' is provided in order to hold and position the disk cartridge. As another examples, positioning means may be provided in frame 7 and a pressure means may be provided in chassis 12, as shown in Embodiment 8 in FIG. 17. The pressure means may be provided both in frame 7 and chassis 12, as shown in Embodiment 9 in FIG. 19. Two pressure means may be provided in frame 7 as shown in Example 10 in FIG. 20. In FIG. 17, the reference numeral 42 is a coiled spring as a pressure means. Fixing member 43 fixes coiled spring 42 to chassis 12. Plate supporting member 44 is one part of frame 7. FIG. 18 is a sectional view of Example 11 and illustrates the condition of disk cartridge inserted into the read/write apparatus. In the read/write apparatus, chassis 12 has a pressure means and frame 7 has a plate supporting member. The reference numeral 45 is a leaf spring as a pressure means. Fixing member 46 fixes leaf spring 45 to chassis 12. Plate supporting member 44 or 44' is one part of into the frame. The plate supporting member 44 or 44' has inclined planes 441 and 442 so that a disk cartridge can be smoothly inserted into or removed from a read/write apparatus. When a disk cartridge is positioned at the read/write position as shown in FIG. 18, spring 45 directly contacts with and presses plate 4'. When frame 7 is disposed at the position for disk cartrige being inserted or removed, spring 45 can be prevented from contacting with a disk cartridge. Therefore, it is not necessary to take account of interference with a pressure means when a disk cartridge is inserted into or removed from the read/write apparatus, and the configuration of pressure means can be more freely changed.

Figure 19:
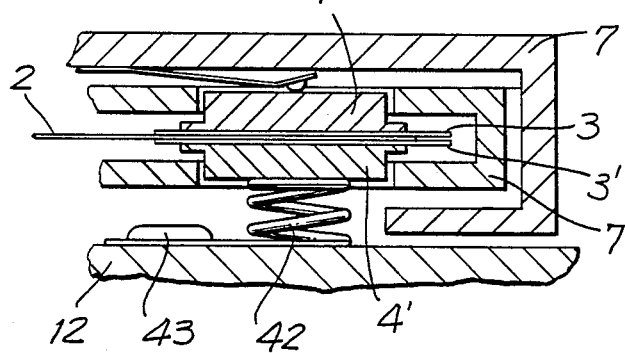
FIG. 19 is a sectional view of a read/write apparatus in which springs are provided in a frame and a chassis, respectively and shows that the condition that a disk cartridge is set.

In FIG. 19, spring 14 is provided in frame 7. Spring 42 is provided in chassis 12 to press plate 4 or 4'. In FIG. 20, spring 14 or 14' is provided in frame 7 to press plate 4 or 4'. When a disk cartridge is set as shown in FIGS. 19 and 20, plate 4 or 4'is pressed by a spring. Then, liner 3 or 3' is pressed down on disk 2 and disk cleaning is accomplished.

Although when plate 4 or 4' is supported by a plate supporting member, disk 2 is positioned along the plate which is supported and positioned by plate supporting member, in these Examples 9 and 10, the plate can be moved freely and plate 4 or 4' is positioned along disk 2 since plate 4 or 4' is positioned at point two springs keep balance in force. Accordingly, liner 3 or 3' is adapted to disk 2. Especially, when a disk has a high rigidity, the structure as shown in Examples 9 or 10 is available. Of course, for springs 14, 14' and 42, any kind spring can be used and spring force controlling mechanism can be provided either a spring or both springs. Further, structure as shown in Example 12 in FIG. 21 is effective in order to improve the tracking property of plate 4 or 4' to disk 2.

In FIG. 21, supporting axis 48 is provided in frame 7 and spring 47 is fixed into supporting axis 48 so that it can be rotated freely. Contact portion 473 or 474 directly contacts with plate 4 or 4', thereby pressing liner 3 or 3' against disk 2. However, since spring 47 is supported by supporting axis 48 so that it can be rotated, the spring does not add pressure to control position of the disk 2. When a disk cartridge is removed, contact portion 471 or 472 contacts with frame 7, and contact portion 473 is spaced away from contact portion 474. As a result, disk cartridge can be easily inserted into the read/write apparatus.

Figure 23:
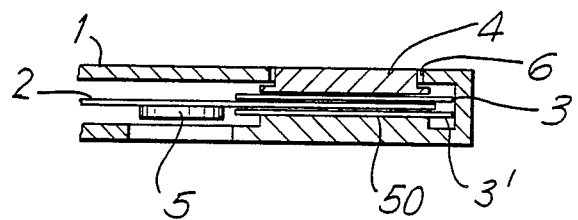
FIG. 23 is a sectional view of a disk cartridge in which the lower plate is one part of a shell.
Figure 24:
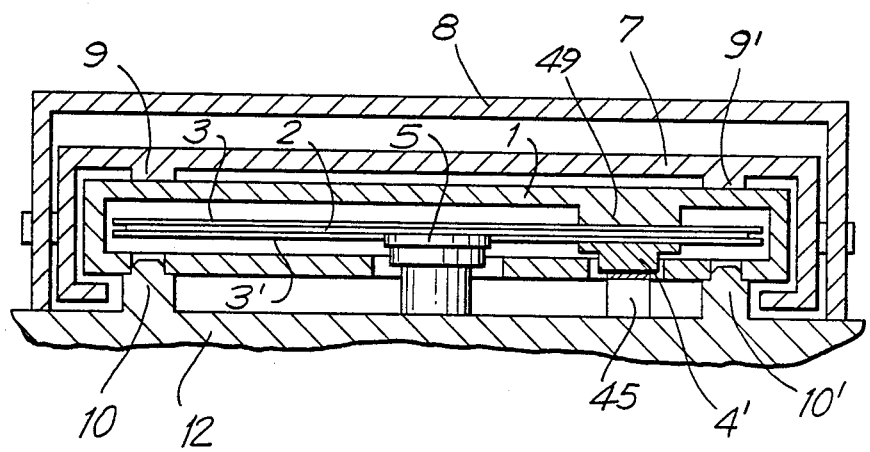
FIG. 24 is a sectional view of a read/write apparatus and shows the condition that a disk cartridge in which the upper plate is one part of a shell is set on the predetermined position for reading and writing information.
Figure 25:
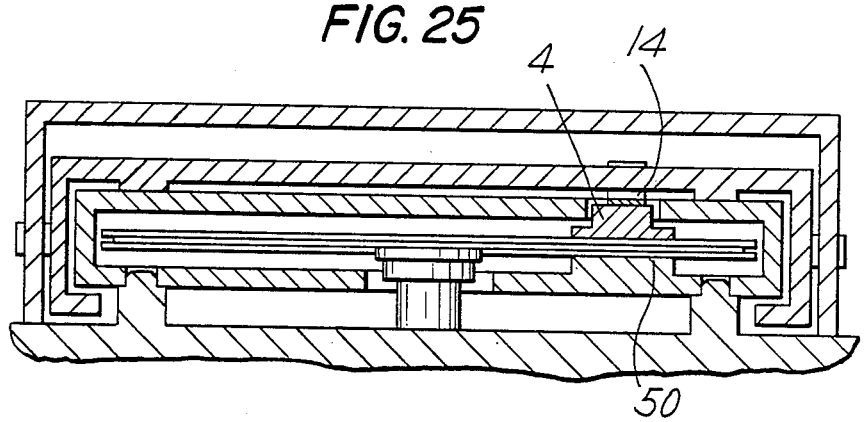
FIG. 25 is a sectional view of a read/write apparatus and shows the condition that a disk cartridge in which the lower plate is one part of a shell is set on the predetermined position for reading or writing information.

In the above-mentioned Examples, all the disk cartridge has two plates. For a disk cartridge having a plate which is one part of a shell as shown in FIGS. 22 and 23, the same result is obtained. Shell plate 49 as shown in FIG. 22 or shell plate 50 as shown in FIG. 23 is one part of a shell and opposed to a plate. When a disk cartridge having a structure as shown in FIG. 22 or FIG. 23 is inserted into a read/write apparatus and set on the predetermined position for reading and writing information, the condition as shown in Examples 13 and 14 in FIGS. 24 and 25, respectively is obtained. A shell is held and positioned by positioning pin 10 or 10' and plate 4 or 4' is pressed by spring 14' or 45 to remove dust from the disk. Moreover, other reference numerals of members is not explained here because they are common to the above mentioned Examples. Thus, when a plate is one part of a shell, the number of members are advantageously reduced and the plate supporting member which requires high-accuracy is not necessary.

Figure 26:
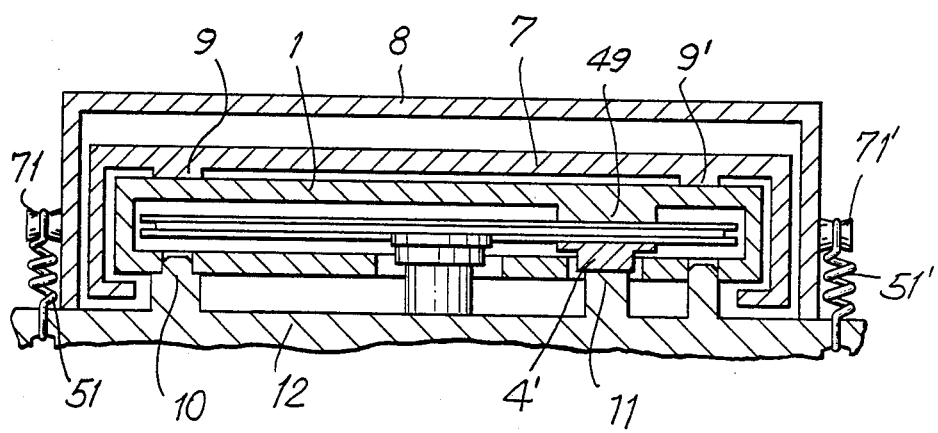
FIG. 26 is a sectional view of an example in which a plate is indirectly pressed.

FIG. 26 shows Example 15. In FIG. 26, pin for setting spring 71 or 71' is one part of frame 7. Spring 51 or 51' is engaged with the pin for setting spring at one end and engaged with chassis 12 at the other end. Plate supporting member 11 contacts with plate 4'. In Example 13 in FIG. 24, spring 45 is provided in chassis 12. However, if frame 7 is resiliently pressed against chassis 12 as shown in Example 15, the whole shell 1 is pressed downward by frame 7. Therefore, if spring 45 is formed of rigid plate supporting member, plate 4' is pressed. Namely, plate 4' is pressed not only by direct virtue of spring but also by indirect virtue of pressure.

As mentioned above, the present invention provides the pressure of a liner against a disk by virtue of pressure means provided outside of disk cartridge. Therefore, the kinds of material and the configuration, can be freely designed and proper pressure can be easily obtained. If necessary, the control mechanism for pressure can be provided.

Further, when a disk cartridge is not set in a read/write apparatus, a liner or a disk is free from the pressure and a pressure means member is not deformed. Therefore, the material of members hardly wears with time. Accordingly, pressure hardly changes.

Furthermore, when the present invention is applied to a read/write apparatus in which the read/write head pressure against the disk is utilized in order to obtain the chucking force, the pressure can be controlled in consideration of desirable chucking force since the liner pressure against the disk is freely controlled according to the present invention.

We claim:

1. A read/write apparatus for a disk cartridge, comprising:
    a chassis;
    a moveable frame supported on the chassis for receiving a disk cartridge, the frame being moveable from an ejection position where the cartridge is inserted and removed to a loaded position for reading and writing;
    the disk cartridge including a shell having at least one opening therein, a disk mounted within the shell with a hub member at the center of the disk, a liner supported within the shell on at least the side of the disk facing the opening, a plate mounted within the opening for pressing the liner against the disk;
    driving means mounted on the chassis for rotating the disk;
    biasing means for maintaining the frame in the loaded position with the hub member engaging the driving means and the biasing means pressing the plate against one surface of the disk; and
    a pressing means for supporting the opposite surface of the disk, whereby the liner cleans the disk when the biasing means biases the frame to the loading position.

2. The read/write apparatus of claim 1, wherein the pressure means is at least two solid members coming into contact with the cartridge as the frame is displaced from the ejection position to the loaded position.

3. The read/write apparatus of claim 1, wherein the pressure means is a rigid supporting member formed on the chassis.

4. The read/write apparatus of claim 3, wherein the shell has two surfaces, an opening formed in both surfaces of the shell and two liners mounted therein, a first plate mounted within the first opening and a second plate mounted within the second opening; wherein, the biasing means biases the first plate to bring the liner in contact with the disk and the second plate contacts the second liner by contact from the pressure means.

5. The read/write apparatus of claim 4, wherein the pressure means includes a spring.

6. The read/write apparatus of claim 3, wherein the pressure means includes a spring.

7. The read/write apparatus of claim 1, further including a second liner supported within the shell at a side of the disk opposed to the first liner, wherein the shell includes a top and a bottom, one opening being formed in the top of the shell and one opening being formed in the bottom of the shell, further including a shell plate integrally formed with the shell extending internally of the cartridge opposite the plate, whereby the shell plate is biased by the pressure means.

8. The read/write apparatus of claim 7, wherein the pressure means is a leaf spring integrally formed with the frame.

* * * * *